F. H. BUCKINGHAM.
PLATFORM LEVER MECHANISM.
APPLICATION FILED JULY 23, 1910.

993,822.

Patented May 30, 1911.
4 SHEETS—SHEET 1.

Witnesses
Albert A. Hofmann
Elizabeth M. Brown.

Inventor
Fremont H. Buckingham.
By Edward N. Pagelsen,
Attorney

F. H. BUCKINGHAM.
PLATFORM LEVER MECHANISM.
APPLICATION FILED JULY 23, 1910.

993,822.

Patented May 30, 1911.

4 SHEETS—SHEET 2.

Witnesses
Albert A. Hofmann
Elizabeth M. Crown

Inventor
Fremont H. Buckingham.
By Edward N. Pagelsen,
Attorney

F. H. BUCKINGHAM.
PLATFORM LEVER MECHANISM.
APPLICATION FILED JULY 23, 1910.

993,822.

Patented May 30, 1911.

4 SHEETS—SHEET 3.

Witnesses
Albert A. Hofmann
Elizabeth M. Brown

Inventor
Fremont H. Buckingham
By Edward N. Pagelsen
Attorney

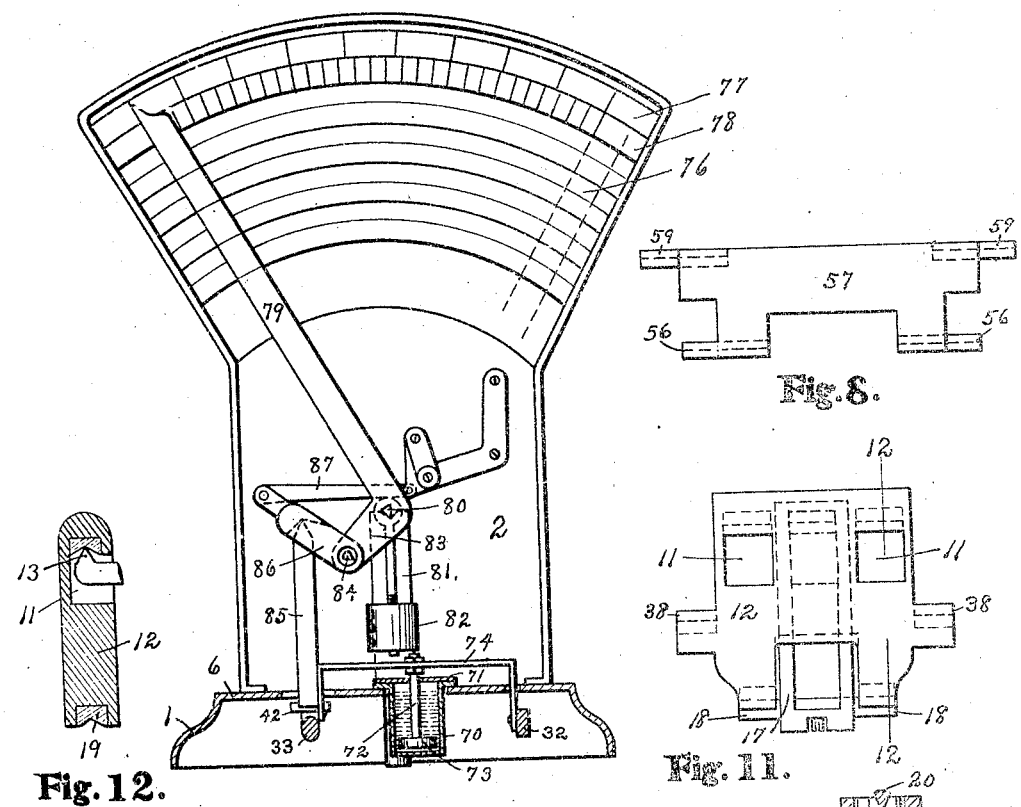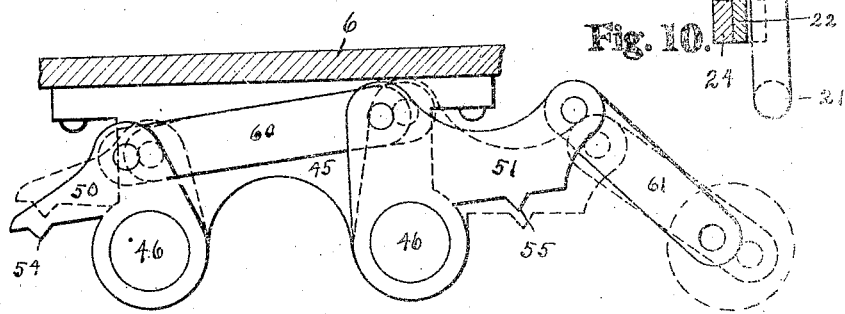

UNITED STATES PATENT OFFICE.

FREMONT H. BUCKINGHAM, OF DETROIT, MICHIGAN, ASSIGNOR TO STANDARD COMPUTING SCALE COMPANY, LIMITED, OF DETROIT, MICHIGAN, A LIMITED PARTNERSHIP.

PLATFORM-LEVER MECHANISM.

993,822.  Specification of Letters Patent.  Patented May 30, 1911.

Application filed July 23, 1910. Serial No. 573,422.

*To all whom it may concern:*

Be it known that I, FREMONT H. BUCKINGHAM, a citizen of the United States, and a resident of Detroit, in the county of Wayne and State of Michigan, have invented a new and useful Platform-Lever Mechanism, of which the following is a specification.

The main scale-lever and its supports, which form the principal subject-matter of this invention, are so constructed that their operative connection may be changed, and the load resisting mechanism variably affected by equal loads on the platform, because of such change.

The present invention is embodied in a platform lever mechanism so constructed that the leverage of the beam connecting to the load resisting device may be changed, together with movable pivots and connections for such lever-mechanism.

Figure 1:
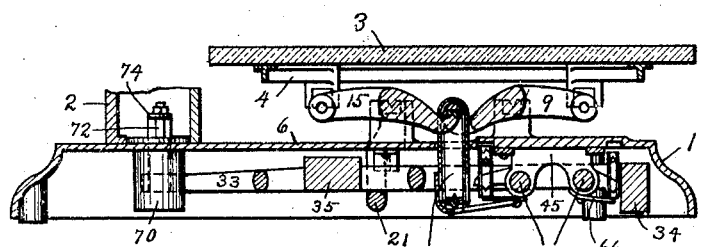
Figure 2:
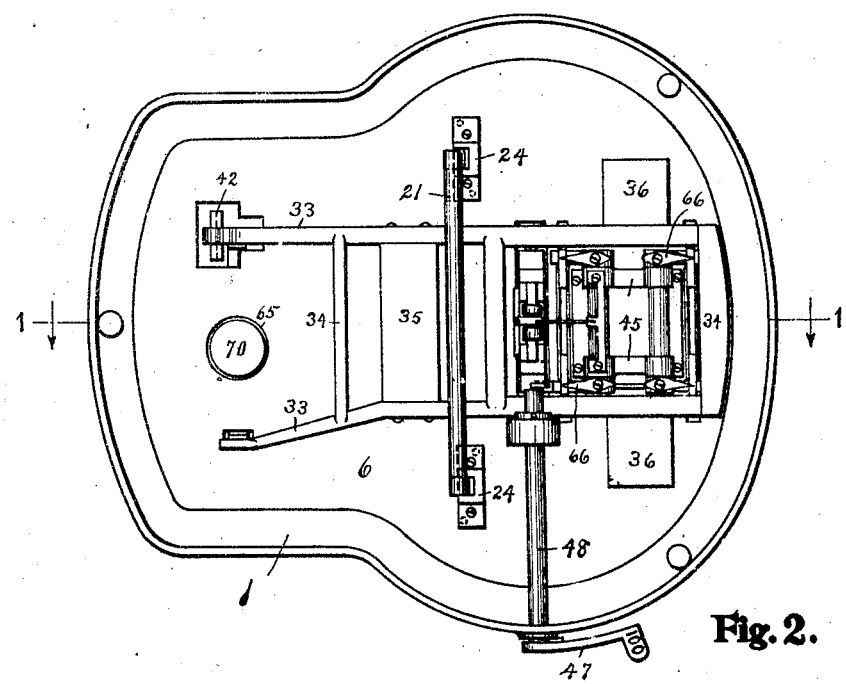
Figure 3:
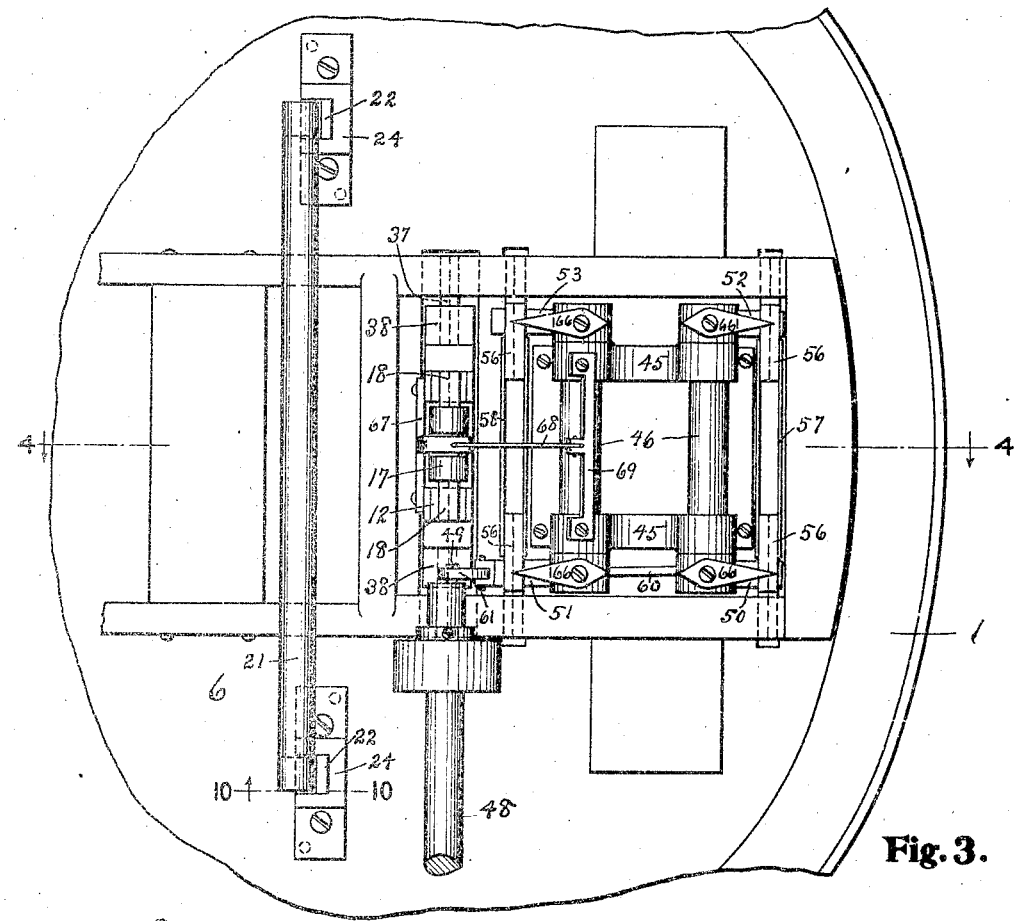
Figure 4:
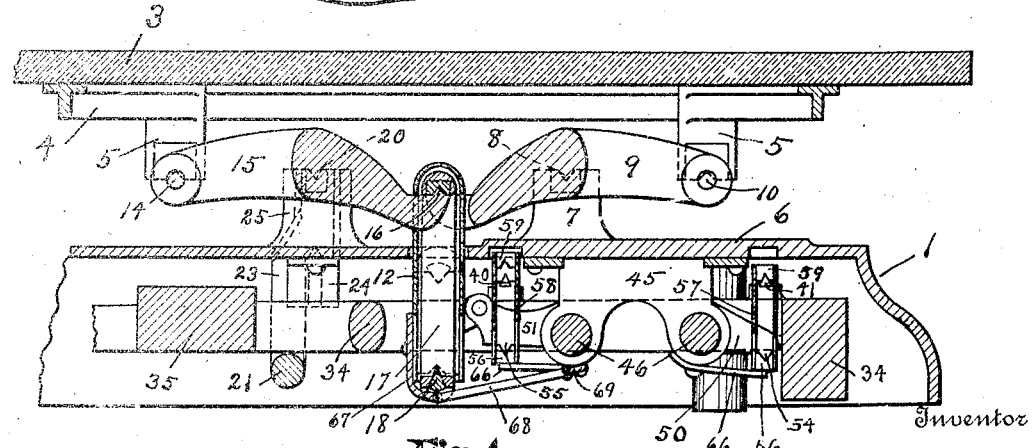
Figure 5:
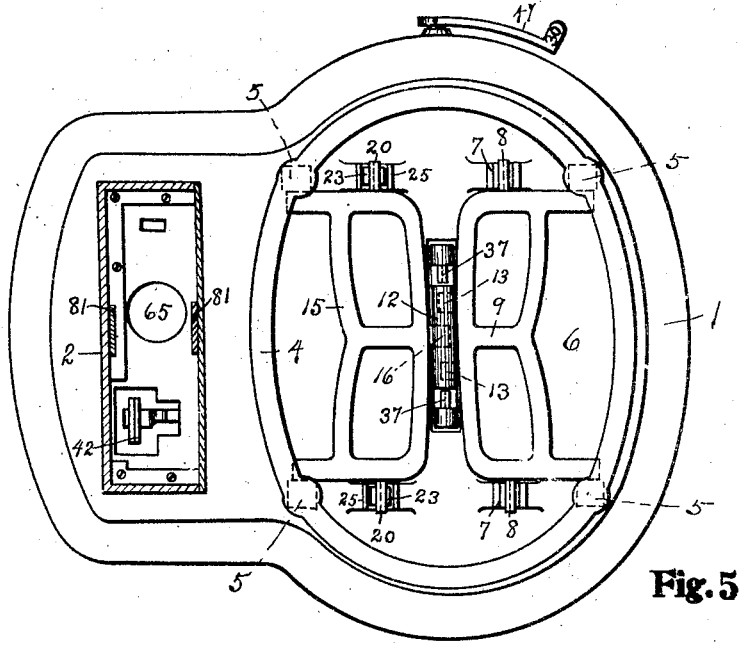

In the accompanying drawings, Figure 1 is a vertical section of the scale on the line 1—1 of Fig. 2. Fig. 2 is a bottom plan of the scale base and the mechanism therein. Fig. 3 is a portion of the same on a larger scale. Fig. 4 is a cross section on the line 4—4 of Fig. 3. Fig. 5 is a plan of the base with platform supporting means. Fig. 6 is an elevation showing a weight indicating device. Figs. 7 to 12 inclusive are details of parts, Fig. 10 being a cross section on the line 10—10 of Fig. 3, and Fig. 12 on the line 12—12 of Fig. 11.

Similar reference characters refer to like parts throughout the several views.

Other conditions being equal, a scale is sensitive in practically the same degree as the two arms of the main lever approach equality of length. Articles which have a low price per pound are usually sold in larger quantities at retail than such as have a high value. The drawings of this application show a computing scale of the pendulum type so constructed that smaller quantities may be weighed by means of mechanism of less leverage than when larger quantities are on the platform. This is accomplished by providing the main lever with a plurality of fulcra, so positioned, that the leverage may be increased or decreased.

While any desired type of weight indicating and weight resisting mechanism may be employed, that shown in the former Buckingham Patent No. 939,213, dated Nov. 9, 1909, has been indicated in Fig. 6. The graduations may denote any desired sums or amounts, depending on the character of the goods weighed, but will preferably be in double lines, one line of each pair for each position of the leverage-controlling device.

The base 1 may be of any desired form and height. Above it is mounted the case 2 of the indicating mechanism, the front of the case being omitted in Fig. 6. A platform 3, of any desired material, preferably glass, rests on the elliptical platform frame 4, having feet 5. The various refinements of the scale-maker's art may be employed, such as adjustable agate bearings and adjustable knife-edges of hard steel, wherever necessary, but these details will not be mentioned hereafter.

Projecting upward from the upper plate 6 of the base are the pedestals 7 which support the knife-edges 8 of the secondary-lever 9. The rear feet 5 of the frame 4 rests on the outer knife-edges 10 of this lever. At the inner end of this lever is a forked neck having two upwardly turned knife-edges 13, which enter the openings 11 in the link 12, (Figs. 11 and 12) which has bearings for these knife-edges at the upper part of these openings.

The front feet 5 of the frame 4 rest on the outer knife-edges 14 of the other secondary lever 15. On the opposite end, this lever has a neck provided with a knife-edge 16 which enters an opening in the upper end of the inner link 17. This inner link carries knife-edges 18 at its lower end which engage the bearings 19 in the lower end of the link 12. See Figs. 11 and 12. The knife-edges 20, which are the fulcrum of this lever 15 rest on yieldable pedestals 23 which are connected by a bar 21. Secured to the bottom of the plate 6 are stirrups 24 which carry the knife-edges 22. The pedestals 23 have upper and lower bearings, the former receiving the knife-edges 20 of the lever 15, and the lower bearings receiving the pivots 22. This combination of the two links 12 and 17 and the movable pedestals 23 accommodates the angular movements of the levers 9 and 15. The pedestals 23 may be guarded by the short tubes 25 which project upwardly from the plate 6.

Figure 9:
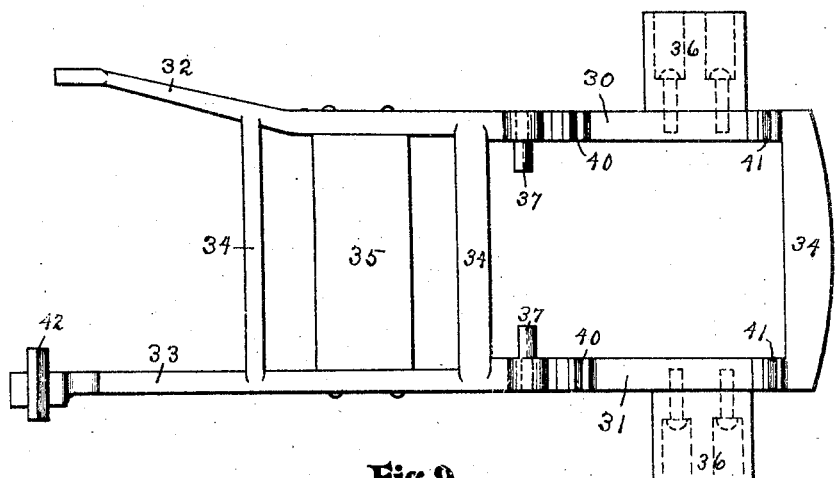

The main lever of this scale is of the second order and the end which connects to the indicating mechanism moves upward as the load moves downward because the secondary levers are of the first order and cause the links 12 and 17 to move upward as the platform descends. Referring to Fig. 9, it will be seen that the lever is in the form of a grid having sides 30 and 31, forward arms 32 and 33, and cross bars 34. The pieces 35 and 36 are counterweights, which together with the main lever, balance the parts just described. The lever carries knife-edges 37 which rest in the bearings in the lugs 38 on the sides of the link 12.

The main lever has two independent fulcra formed by the knife-edges 40 and 41. At the outer end of the arm 33 is a knife-edge 42 to which the indicating mechanism is connected.

Brackets 45 extend downward from the plate 6 and carry the shafts 46. A controlling lever 47 is secured to the outer end of the controlling crank-shaft 48, which has a crank-pin 49 at its inner end. See Figs. 3 and 7. Secured to these shafts 46 are the crank-arms 50, 51, 52 and 53, which are provided with knife-edges 54 and 55 which are adapted to engage the lower bearings 56 of the links 57 and 58. These links are duplicates and are shown in Figs. 3, 4 and 8. The upper bearings 59 are adapted to engage the fulcrum knife-edges 40 and 41 of the main lever. The crank-arms 50 and 51 are connected by a link 60 and the arm 51 is connected to the crank-pin 49 by the link 61.

As shown in Fig. 7, one half revolution of the shaft 48 will swing the crank-arms from the position shown in dotted lines to that in solid lines or back again. As the pull of the link 12 on the knife-edges 37 is upward, the thrust of the knife-edges 40 and 41 will be upward against the upper bearings 59 of the links 57 and 58, and these links will therefore pull upward against the knife-edges 54 and 55 respectively of the crank arms. The weights of these links 57 and 58 are supported by the small springs 66 secured to the crank-arms as shown in Figs. 3 and 4. A bracket 67, connected to the link 12, carries one end of the link 68, the other end of which is pivoted to the cross bar 69 mounted on the brackets 45. The lower ends of the links 12 and 17 are thereby kept from swinging out of line by a load on one side of the platform.

In the front end of the plate 6 (Fig. 6) a dash-pot 70 may be mounted in the opening 65 and be provided with a cover 71. The rod 72 is connected to the piston 73 and to the yoke 74 which extends across between the arms 32 and 33 of the main lever.

Referring now to Fig. 6, it will be seen that the fan shaped dial 76 is provided with two series of graduations 77 and 78, besides lines for figures. An indicator 79 is provided with knife-edges 80 which rest on the brackets 81. Connected to the indicator are the pendulum 82 and an arm 83 having a knife-edge 84. A thrust-rod 85 rests on the knife-edge 42, at the end of the main lever, and engages the link 86. This link engages the knife-edge 84 and its opposite end is guided by the connecting-rod 87. By this link-movement the indicator is caused to travel through substantially equal arcs for equal movements of the main lever. For further explanation of the indicating mechanism, reference is made to the patent cited above.

The operation of the scale is as follows: The proportions of the arms of the levers 9 and 15 may be varied as desired. In the drawings they are shown to be of substantially the same length. The downward pressure of the load on the pivots 10 and 14 of these levers will cause an upward pull on the links 12 and 17, the knife-edges 18 of the link 17 transferring the pull of the lever 9 to the link 12. The upward stress is transferred to the knife-edges 37 of the main lever. When the parts are in the positions shown in Fig. 4 of the drawings, the arms 50 and 52 are depressed, thereby holding down the link 57 with its bearings 59 in engagement with the knife-edges 41 at the outer end of the main lever. The line of the edges of these pivots defines the fulcrum of the main lever and the load-arm is the distance from this line to the line of the pivots 37, while the power-arm is from the same line to the knife-edge 42. This ratio may be as desired by properly proportioning the lever arms, and is preferably indicated by some character on the end of the controlling lever 47, 30 being shown in Fig. 5. If now this controlling lever 47 is swung forward one-half revolution, the crank-arms 50 and 52 will be elevated and the arms 51 and 53 depressed, lifting the link 57 from the knife-edges 41 and lowering the link 58 onto the knife-edges 40. The line of the knife-edges 40 now constitutes the fulcrum of the main lever, whose load-arm is the distance from this line to the line of the pivots 37, while the power-arm is from the same line to the knife-edge 42. In swinging the operating-crank 47, the character 100 on the lower side (see Fig. 2) is brought to view. The levers in the drawings are so proportioned that for equal loads on the platform, the indicator 79 will move three and one-third times farther when the character 30 is visible on the controlling lever 47 than when 100 is in view.

As stated before, the scale is more sensitive when the longer leverage is employed. The characters on the controlling-lever may indicate certain limits in weight which can be determined, or of which the price can be computed when these numbers are in view.

The user will be instructed that graduation 77 will be used when the longer load-arm is employed and graduations 78 with the shorter. Similar instructions may be given when two lines of computations are employed for each price-per-pound.

The changes in the details of construction may be made by those skilled in the scale-maker's art without departing from the spirit of my invention.

Having now explained this embodiment of my invention what I claim and desire to secure by Letters Patent is:—

1. In a scale, the combination of a base, a main lever, a plurality of fulcra for the lever, a plurality of bearings mounted on the base, one for each fulcrum, a load-resisting device connected to said lever, and a load-receiving device connected to the lever between said fulcra and the load-resisting device.

2. In a scale, the combination of a base, a main lever of the second order, a plurality of fulcrum pivots on the lever, a bearing mounted on the base for each fulcrum pivot, a load-resisting device connected to one end of said lever, and a load-receiving device connected to said lever intermediate its ends.

3. In a scale, a main lever of the second order, a plurality of fulcrum pivots on the lever, movable bearings adapted to press down on said fulcrum pivots, a load-resisting device adapted to be moved upward by one end of said lever, and a load-receiving device connected to said lever intermediate said fulcra and the load-resisting device and pulling upward on the same.

4. In a scale, the combination of a base, a main lever below the same and having a knife-edge at one end, load-resisting means connected thereto, links movably supported below said base, each adapted to engage said lever at a different distance from said knife-edge, and a load-receiving device connecting to said lever intermediate its ends.

5. In a scale, the combination of a base, a main lever below the same, a pair of secondary levers, a platform resting on the outer ends of the secondary levers, pedestals for said levers, links connecting the inner ends of the secondary levers and the main lever intermediate its ends, a load-resisting device connected to said main lever, and a plurality of fulcra for said main lever, adapted to be alternately employed for weighing.

6. In a scale, the combination of a platform, a plurality of bearing-links, pivots to engage the lower ends of said links alternately, means to move the pivots of said links in opposite directions, a main lever having a plurality of sets of pivots, one set in line with each link, a load-receiving device, means to connect the same to said lever, a load-resisting device, and means to connect the same to the lever on the opposite side of said load-receiving connection from the links.

7. In a scale, the combination of a platform, a pair of pedestals rigid therewith, a second pair of pedestals yieldably mounted thereon, secondary levers mounted intermediate their ends on said pedestals, a load-receiver engaging the outer ends of said levers, links connected at their lower ends engaging the inner ends of the levers, a main lever connected to said links intermediate its ends, a load-resisting device connected to one end of the main lever, and bearings adapted alternately to engage pivots on the opposite end of the main lever.

8. In a scale, a main lever of the second order, a plurality of fulcrum pivots on the lever, bearings adapted to engage said fulcrum pivots, one for each pivot, vertically movable supports for said bearings, a load-resisting device connected to one end of said lever, and a load-receiving device connected to said lever intermediate its ends.

9. In a scale, a main lever of the second order, a plurality of fulcrum pivots on the lever, bearings adapted to press down on said fulcrum pivots, vertically movable supports for said bearings, a load-resisting device adapted to be moved upward by one end of said lever, and a load-receiving device connected to said lever, intermediate its ends and pulling upward on the same.

10. In a scale, the combination of a base, a main lever below the same and having a knife-edge at one end, load-resisting means connected thereto, links movably supported below said base, each adapted to engage said lever at a different distance from said knife-edge, crank-arms to engage the links at their lower ends, and a load-receiving device connecting to said lever intermediate its ends.

11. In a scale, the combination of a base, a main lever of the second order below the same, a pair of secondary levers of the first order, a platform resting on the outer ends of the secondary levers, pedestals for said levers, links connecting to the inner ends of the secondary levers and to the main lever intermediate its ends, a load-resisting device connected to said main lever, a plurality of fulcra for said main lever adapted to be alternately employed for weighing, and movable supporting means for said links.

12. In a scale, the combination of a platform, a plurality of bearing-links, pivots to engage the lower ends of said links alternately, means to alternately raise and lower said pivots, a main lever having a plurality of sets of pivots, one set in line with each link, a load-receiving device, secondary levers to support the same, links connecting the inner ends of the secondary levers to the main lever intermediate its ends, a load-resisting device, and means to connect the same to the lever on the opposite side of said load-receiving connection from the links.

13. In a scale, the combination of a platform, a pair of pedestals rigid therewith, a second pair of pedestals yieldably mounted thereon, secondary levers mounted intermediate their ends on said pedestals, a load-receiver engaging the outer ends of said levers, links engaging the inner ends of the levers, pivots connecting the lower ends of the links, a main lever connected to said links intermediate its ends, a load-resisting device connected to one end of the main lever, links having bearings in their upper ends, alternately to engage pivots on the opposite end of the main lever, and vertically movable supports engaging bearings in the lower ends of said links.

14. In a scale, the combination of a base, brackets supported thereby, shafts supported in said brackets, crank-arms connected to said shafts and having pivots on their lower sides, a main lever mounted adjacent said crank-arms and having pivots above those on the crank-arms, a plurality of links having upper bearings in line with the pivots on the lever and lower bearings in line with the pivots on the crank-arms, means to rock said shafts to bring the bearings of either link into operative connection with the adjacent pivots, a load-indicating device, a load-receiving device, and means for connecting the same to the main lever.

In testimony whereof I have signed this specification in the presence of two subscribing witnesses.

FREMONT H. BUCKINGHAM.

Witnesses:
L. JAENICHEN,
J. M. BUCHE.